(12) United States Patent
Wallace et al.

(10) Patent No.: US 9,473,593 B2
(45) Date of Patent: Oct. 18, 2016

(54) COACHING AND TRAINING SYSTEM AND METHOD FOR INTEGRATED MONITORING, MANAGING, SUPPORTING, SCHEDULING AND PROMPTING OF CLIENTS

(71) Applicants: Luke A. Wallace, San Luis Obispo, CA (US); Alex Minicucci, San Luis Obispo, CA (US)

(72) Inventors: Luke A. Wallace, San Luis Obispo, CA (US); Alex Minicucci, San Luis Obispo, CA (US)

( * ) Notice: Subject to any disclaimer, the term of this patent is extended or adjusted under 35 U.S.C. 154(b) by 148 days.

(21) Appl. No.: 14/120,767

(22) Filed: Jun. 25, 2014

(65) Prior Publication Data

US 2015/0379891 A1    Dec. 31, 2015

(51) Int. Cl.
*G06F 15/16* (2006.01)
*H04L 29/06* (2006.01)
*G09B 19/00* (2006.01)

(52) U.S. Cl.
CPC .............. *H04L 67/42* (2013.01); *G09B 19/00* (2013.01)

(58) Field of Classification Search
USPC ................... 709/203, 202, 223, 227, 201
See application file for complete search history.

(56) References Cited

U.S. PATENT DOCUMENTS

| | | | |
|---|---|---|---|
| 9,031,812 B2* | 5/2015 | Roberts | G08B 21/182 235/105 |
| 2013/0337974 A1* | 12/2013 | Yanev | G06F 19/3481 482/8 |
| 2014/0289301 A1* | 9/2014 | Ono | G06F 15/0225 708/607 |
| 2015/0238817 A1* | 8/2015 | Watterson | G06F 19/3481 482/8 |

* cited by examiner

*Primary Examiner* — Lan-Dai T Truong

(57) ABSTRACT

An integrated system and method to permit coaches, trainers and other life enhancement entities and individuals to monitor, manage, support, schedule, prompt and otherwise motivate clients to achieve set goals, establish new goals and continue routines during times of non-personal interaction between the coach, trainer or enhancement entity or person and the client.

14 Claims, 4 Drawing Sheets

COACHING AND TRAINING SYSTEM AND METHOD FOR INTEGRATED MONITORING, MANAGING, SUPPORTING, SCHEDULING AND PROMPTING OF CLIENTS

FIELD OF THE INVENTION

The present invention relates to the field of managed training, and more particularly to the field of managed training or coaching during periods between times of personal contact between the trainer/coach and the client. The present invention relates to an integrated system and method to permit coaches, trainers and other life enhancement entities to monitor, manage, support, schedule, prompt and otherwise motivate clients to achieve set goals, establish new goals and continue routines during times of non-personal interaction between the coach, trainer or enhancement entity and the client. The invention permits interactive communication between a trainer/coach and a plurality of clients, during periods when there is no personal contact, to foster an ongoing relationship and provide accountability and engagement in order to maximize the effectiveness of the training or coaching.

The present invention relates to a system and method to permit trainers/coaches to maintain contact with multiple clients, update the clients' activities, motivate the clients to attain their goals and continue training/coaching without the physical presence of the trainer/coach or real time telephone communication between them and to further allow automatic, "learned" alteration of motivational messages to maximize effectiveness and response, and promote the benefits of working with the trainer/coach.

The present invention further relates to a system and method which may be employed by various persons or entities who seek to communicate and provide interaction with their clients or customers during times when those customers are not in personal contact with the persons or entities. Thus, this invention could be advantageously employed by doctors communicating to patients between visits or appointments, nutritionists communicating with clients, sales organizations who wish to remind clients to buy repeatedly used goods (or to buy complementary goods), as well as others in similar fields.

BACKGROUND OF THE INVENTION

A general coaching and training craze has recently swept the United States and other countries. People around the world, but particularly in the United States, have looked to coaches to assist them in everything from work related issues to nutrition to "how-to-succeed" in life. On the health and fitness side, the trend goes from fat-free potato chips to treadmills and people around the world have become obsessed with weight loss, healthy living and living a "good life". Accordingly, record numbers of new fitness products, health techniques and coaching needs have emerged to meet these needs and obsessions, including stair climbers, treadmills, recumbent bicycles, ski machines, rowing machines, weight lifting machines, and the like, as well as Pilates, various forms of yoga, life coaching etc.

As in all instances, however, products and techniques must be utilized regularly to be useful, whether for weight loss, for improving cardiovascular stamina, and for strengthening various muscles, in the case of physical training, to practicing regularly the tenets of motivational coaching to strengthen one's ability to achieve goals in their life.

Physical Training and Wellness Coaching

While many pieces of exercise equipment include a monitoring device that may include a pulse monitor, a distance meter, a rate monitor, a time monitor, a strain gauge, an accelerometer and/or any other sensor for measuring the physical activity/performance level of an user on the equipment, they often do not provide a true picture of the benefit of any given exercise regimen and they do not motivate a person to continue to use them when there is no one pushing them to do so.

A limiting factor of many exercise machines and exercise routines is that they are boring to utilize because of their inability to encourage a user to continue exercising. In the case of machines, display screens that depict a user's location within a selected exercise program may be provided; however, they typically include dull graphics.

One solution to improving graphical rendering is provided in U.S. Pat. No. 5,947,868 ("'868 patent"). In the '868 patent, an exercise monitor outputs a signal representative of the performance level of a user utilizing the exercise equipment (e.g. pulse rate, distance traveled, time exercised, rate of exercise, etc.). The performance level signal then is fed to a video game player wirelessly or via a cable and the output from the exercise monitor is utilized to control the video game character's performance level within a video game that runs on the video game player.

While this can serve to motivate the user while they are on the machine, it does not assist in motivating the user to use the machine when the trainer is not present. It would be desirable to provide a personal exercise monitor and motivational system that transmits personal data and/or exercise program selections to a trainer who can then provide individualized motivational messages and reminders to prompt the individual to exercise even when the trainer is not present or in personal contact with the client.

While more and more people are exercising in order to improve their general health and physical fitness, for the average person, however, a lack of motivation can significantly hinder their efforts. In addition, the natural tendency is to try and achieve the greatest results in the shortest possible time. When typical measurements of physical fitness and progress such as weight loss are monitored, however, expectations often are not met and unless there is some form of constant reminder that such ultimate fitness takes time and continuous effort the person may choose not to take the required time every day. The result can be a lack of motivation, which in turn leads to a cessation of exercise.

While athletes of all ages are usually able to overcome motivational hurdles by having an ultimate end goal, most individuals who seek to improve their fitness do not have that internal motivational drive or clearly defined end goal. Human nature, especially today, demands instantaneous feedback for motivation and encouragement.

Many individual also do not know how to train effectively for maximal improvement and turn to trainers for assistance and guidance. For example, runners may have difficulty determining whether their pace on a particular day of training is too fast or too slow. While running on a track or treadmill may allow the runner to monitor his or her speed, speed alone is often an inadequate way to monitor optimal training levels.

There are methods of providing feedback to individuals engaged in a physical activity which do not necessitate a trainer. For example, competition, can provide feedback concerning the individual's past training efforts in a particular physical activity. Competition feedback, however, is provided long after the training regimen has been completed, and therefore only allows for adjustments in subsequent training. In addition, many individuals are only interested in improving their general health and physical fitness rather than competing against others.

Another method of providing feedback to an individual engaged in a physical activity is heart rate or other biometric monitoring. Heart rate monitors have become common place in the exercise industry and entire training programs have been developed based upon the data provided by these monitors. While heart rate and other biometric monitoring is a useful tool, the data can be difficult to interpret. In addition, many individuals often resort to standardized tables in order to determine target heart rate training zones. Such standardized tables, however, only provide generalized guidelines which may or may not be appropriate for a particular individual or a particular physical activity. Thus, while monitoring and feedback are important and do provide some information to assist an individual in achieving their health related goals, they do not provide the motivational element which is key to continued improvement in the physical activity sphere.

Accordingly, physical training is often scheduled and executed by coaches or trainers who seek to establish routines and then quantitatively evaluate the training effects of the physical training. However, physical training cannot be efficiently performed for each person unless that person undertakes to participate in the routines even when the coaches or trainers are not present to spur the individuals on, correct any improper exercising and ultimately to ensure that the individual is pushing themselves to optimize the gain from the routine, rather than just going through the motions. To achieve such participation, constant motivation and affirmation of success or accomplishment is often required.

Unlike sports coaches and trainers, wellness coaches do not focus on changing specific behaviors, like correcting a bad swing in baseball. Instead, they develop their clients' overall strengths and abilities. Wellness coaches give their clients the motivation and tools they need to achieve their physical and emotional health goals.

Wellness coaches can show a client steps to take and give them encouragement to reach goals such as:
  Lose a few pounds
  Eat better
  Quit smoking
  Reduce stress Unlike a nutritionist or physical therapist, who makes specific diet and exercise recommendations, a wellness coach will help a client make better general choices that fit within their lifestyle. However, just like a sports coach or trainer, there is the need to continue to communicate with a client to reinforce goals, encourage continued activity towards that goal and motivate the client to strive on a daily basis toward the goal. In short, to get the client to continue to move forward even on the days when the coach and the client do not see or speak to one another.

Life Coaching and Training

Life Coaching is a profession that is profoundly different from consulting, mentoring, advice, therapy, or counseling. The coaching process addresses specific personal projects, business successes, general conditions and transitions in the client's personal life, relationships or profession by examining what is going on right now, discovering what obstacles or challenges might be, and choosing a course of action to make their life be what you want it to be. It is often a process whereby the coach and client arrive at a goal that is client determined and a path to achieving that goal is laid out with focused action that is set by the client. However, reaching those goals takes hard work and persistence. Often individuals require support, accountability and other motivation to be pushed and challenged in order to continue to strive to reach their goal.

Life coaching is all the rage. Harvard Business Review reports that coaching is a $1 billion a year industry, but just what is a personal coach, professional coach, or life coach and why are so many executives and individuals using them to catapult their careers, break free from 9-5 jobs, and to create better, more fulfilling, richer lives?

First, what is a professional coach? The International Coach Federation (ICF)—the leading global coaching organization and professional association for coaches—defines coaching as "partnering with clients in a thought-provoking and creative process that inspires them to maximize their personal and professional potential."

Second, who's using coaches? In a 2009 study of the professional coaching industry by the Chartered Institute of Personnel Development (CIPD), they found that coaching was used by 90% of organizations surveyed and that even in the economic downturn, 70% report that they are increasing or maintaining their commitment to coaching. Coaching is clearly popular, but what does a professional coach do? Personal coaching, professional coaching, and life coaching involves a unique relationship between a coach and client.

Life coaches provide the incentive and direction their clients need to improve their careers, relationships, and lives. They help clients to:
  Hone in on their skills and ambitions.
  Refocus their life's goals.
  Overcome obstacles that stand in the way of achieving goals.

Life coaching is a designed alliance between coach and client where the coaching relationship continually gives all the power back to the client. Generally, a client will sit down with a life or wellness coach over the telephone or in person for anywhere from 15 minutes to an hour to discuss what the client wants to accomplish. Goals will be defined and challenges that could stand in the way of success will be similarly be defined. The client and coach will outline steps that the client needs to take to achieve the goals and will detail what the client must do between coaching sessions in order to work towards those goal.

While a life or wellness coach, like a sports and fitness coach or trainer, can offer support and guidance along the way, it is ultimately the client who must be the active participant who performs the daily, weekly and monthly activities necessary to achieve their goal. Just like the coaches and trainers who push athletes to achieve greatness in sports, trainers and life and wellness coaches push their clients to achieve success in their health, physical wellbeing, career, relationships, and lifestyle.

All of these coaches and trainers have the need to be able to provide regular and easily accessible motivational messages and contacts to clients to reinforce their actions and prompt them to regularly perform what is needed to achieve success and their goals. The instant invention fulfills that need.

BRIEF SUMMARY OF THE INVENTION

In one aspect, the present invention provides a system and method for use in the field of managed training and coaching, and more particularly to the field of managed training and coaching during periods between times of personal contact between the trainer or coach and the client.

In another aspect, the present invention relates to an integrated system and method to permit coaches, trainers and other life enhancement entities to monitor, manage, support, schedule, prompt and otherwise motivate clients to achieve set goals, establish new goals and continue routines during times of non-personal interaction between the coach, trainer or enhancement entity and the client.

In yet another aspect, the invention permits interactive communication between a trainer or coach and a plurality of clients, during periods when there is no personal contact, to foster an ongoing relationship and provide accountability and engagement in order to maximize the effectiveness of the training or coaching.

The present invention relates to a system and method to permit trainers and coaches to maintain contact with multiple clients, update the clients' activities, motivate the clients to attain their goals and continue training without the physical presence of the trainer and to further automatically alter motivational messages, based upon responses to messages and "learned" parameters to maximize effectiveness and response, and promote the benefits of working with the trainer.

In another aspect, one or more non-transitory computer-readable storage media is/are provided. The non-transitory computer-readable storage media has computer-executable instructions embodied thereon, wherein when executed by at least one processor, the computer-executable instructions cause the at least one processor to acquire data relative to a client to permit the generation of one or more messages to the client for motivational purposes. The system further comprises associated processors that permits the trainer or coach to maintain a bank of daily, editable motivational statements or quotes that can be delivered to a client.

The system and method further provides computer-executable instructions within the non-transitory computer readable storage media to permit the further requesting of client data, the loading of client data and the evaluation of the client data in order to permit the generation of appropriate motivational statements.

The features, functions, and advantages that have been discussed can be achieved independently in various embodiments or may be combined in yet other embodiments further details of which can be seen with reference to the following description and drawings.

DETAILED DESCRIPTION OF A PREFERRED EMBODIMENT

Figure 1:
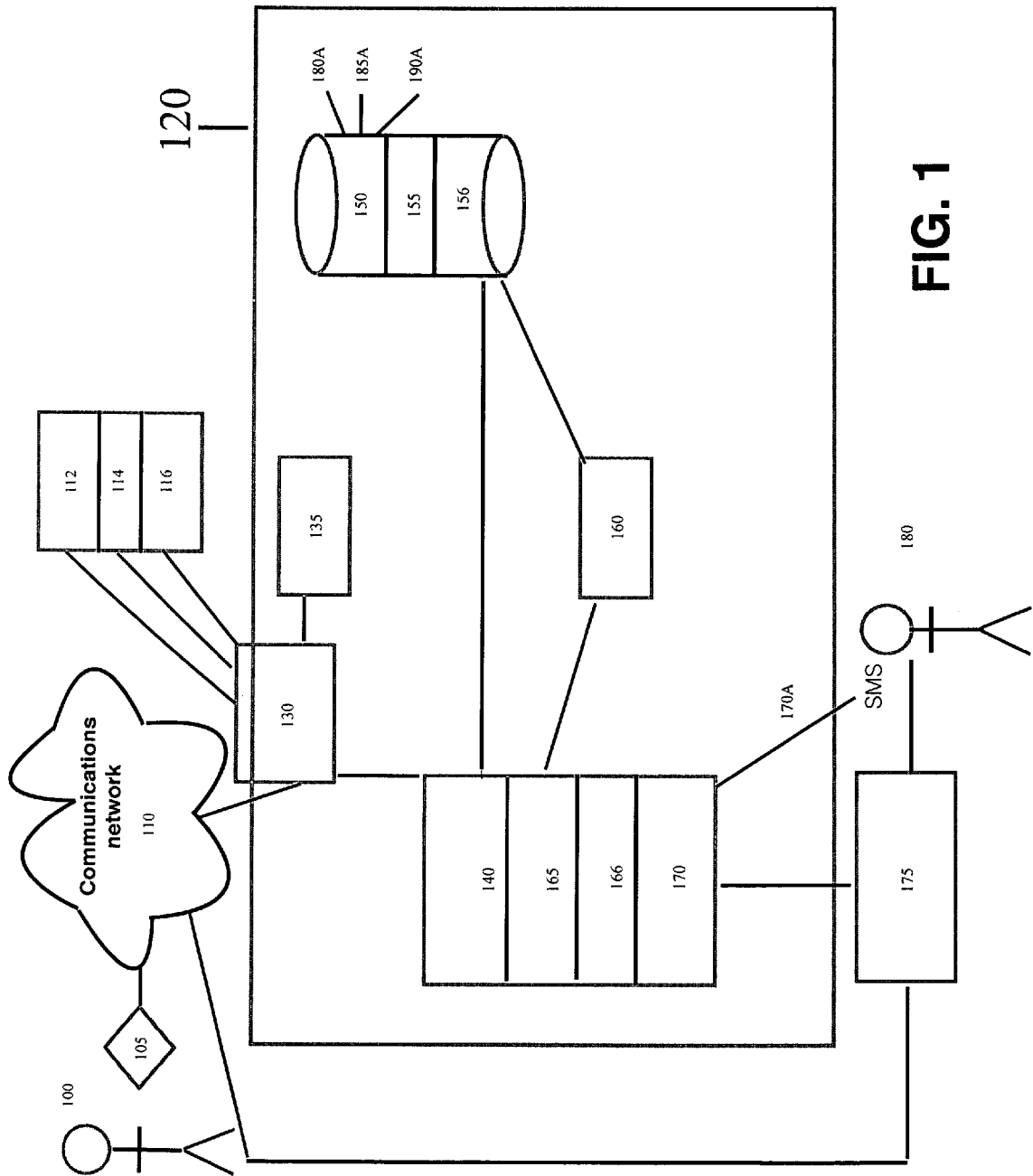
FIG. 1 is a illustrative representation of a data acquisition and processing system in accordance with the method, system and programs of the present invention.

Some embodiments described herein involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The above examples are exemplary only, and thus are not intended to limit in any way the definition and/or meaning of the term processor.

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. For clarity of explanation, the illustrative system embodiment is presented as comprising individual functional blocks (including functional blocks labeled as a "processor" or "engine"). The functions these blocks represent may be provided through the use of either shared or dedicated hardware, including, but not limited to, hardware capable of executing software. For example, the functions of one or more processors presented in FIGS. 1-4, may be provided by a single shared processor or multiple processors. Use of the term "processor" should not be construed to refer exclusively to hardware capable of executing software.

Such electronic or computing devices also typically include a memory coupled to the processor. The memory may include one or more tangible, non-transitory, computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory.

The term "processor" as used herein is broadly defined as one or more processing units of any type for performing all arithmetic and logical operations and for decoding and executing all instructions related to facilitating an execution of the various methods of the present invention. Additionally, the term "memory" as used herein is broadly defined as encompassing all storage space in the form of computer readable mediums of any type.

The methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, such as a firmware, physical and virtual storage, CD-ROMs, DVDs and another digital source such as a network or the Internet, as well as yet to be developed digital means, with the sole exception being a transitory, propagating signal.

In the one form of the present invention, the system comprises a processor and a memory storing data and information about the trainer/coach and the objectives of that individual along with a network communication system storing client information which is related to each trainer/coach. The processor and memory store instructions operable with the processor for executing an interaction among the distinct modules to facilitate a communication between the trainer/coach and the client.

The instructions are executed to permit the communication and to obtain at least some information back from the client in order to provide feedback both as to the actions of the client and to maximize the effectiveness of the messaging. The information that is received from a client is employed to update the client profile in order to individualize the messages to the client.

Referring to FIG. 1, there is illustrated a computer network communication system 120 which may be used by a trainer/coach 100 in accordance with an embodiment of the present invention. The system 120 includes a user interface 105 through which the trainer/coach 100 can provide information. By way of example the trainer/coach 100 may input current clients, prospects, schedules, former clients and other material through the user interface 105. The user interface 105 is connected to a communications network 110 which may include a number of modules including a calendar module 112, a settings module 114, and an administrative module 130.

As will be explained in greater detail in relation to FIG. 3, the administrative module 130 may contain various sub-modules which permit the administrator (not shown) to login and, thereafter view, add and edit trainer/coach 100 profiles as well as review billing reports. Additionally the administrative module 130 may include other accounting, reporting and communication modules to permit automated text messages and electronic mail to be transmitted. Moreover the administrative module 130 may also have a sub-module 116 to serve as a gatekeeper in order to ensure that the trainer/coach 100 has paid whatever the monthly or periodic charge is for the use of the system 120.

Once the trainer/coach 100 has logged into the system 120, he or she is able to set up major functions within that system 120. The trainer/coach 100 will be permitted to set up a database 150 of the trainer/coach's trainees 180 (which will also, alternatively be referred to, as "clients"). The database 150 may advantageously be stored on a data storage, or memory system 155. The data storage or memory system 155 communicates with a application engine 160. The memory system 155 further communicates with a processor 140. The communication may occur via wired or wireless connections on one or more of the processing units such as the computer storage devices or processor 140. Similarly the system 120 and its various modules and sub-modules might be implemented in either software or hardware and the various network systems maybe integrated into a single unit or maybe integrated in other forms.

The trainer/coach 100 (also referred to as a "user") may create their own user profile through the user interface 105 and input information about themself that includes current clients, rates and the prospective clients or goals that the trainer/coach 100 seeks to achieve. The trainer/coach 100 may also provide additional input such as a photograph, questionnaire and various support options for his clients 180.

The information provided by the trainer/coach 100 is stored in compartmentalized silos 156 in order to avoid intermingling of personal client information and to prevent access by someone other than the specific trainer/coach 100 who has imported a client's 180 data.

The processor 140 has access to a set of pre-established messages 165 and has the capability of accepting and employing custom messages 166 that are trainer/coach 100 designated and created. Alternatively a trainer/coach 100 may adapt the pre-established messages 165 in order to create their own messaging hierarchy. The processor 140 advantageously has the further capability of accepting response data in order to permit the intelligent editing and hierarchical establishment of messages as a function of what is most effective for client 180 response and motivation, including, for example, immediacy of response by a client, affirmative reaction response by a client and efficacy of overall program response by a client. All of these, as well as other response parameters, are employed by the processor 140 and its related program software, to permit the determination of the most effective messages and to create new or modified messages and message hierarchies in order to maximize the motivational benefit to the client 180.

A trainer/coach 100 may have different classes of clients in the system 120. By way of example a client 180 may be on a daily motivational schedule whereas another client 180 may be on a twice a day schedule. Similarly a trainer/coach 100 may have current client data 180A, prospect data 185A and former client data 190A on the system with different settings and support for each class. Looking illustratively at FIG. 1, a particular client 180 is shown as receiving a message 170A from the system 120 through the output engine 170. Advantageously the message 170A is received via text (SMS) and may ask for client 180 information such as a weekly weigh in, or may be strictly motivational in nature. Thus, for example, if the message 170A is strictly motivational as an Off-Day message it may remind the client 180 that certain exercises may be appropriate today e.g. if yesterday was a weight exercise day, today should be a cardiovascular day. Alternatively if this was a life coaching client 180, the message might relate to the particular goal that had been set between the life coach 100 and the client 180 during their last telephone or face-to-face communication and a reminder about a particular obstacle that might stand in the way of achieving a goal or a question about whether that obstacle has been dealt with. Alternatively, it could be an automated quote or other saying or thought which would provide general motivation to the client 180

As is seen the embodiment shown in FIG. 1, the client 180 does not have direct access or input capability to the system 120. Rather, the client 180 interacts with the trainer/coach 100 to provide information initially, confirm receipt of the message 170A and respond to the message as required, e.g., weekly weigh-in or specific goal achievement.

The client 180 may communicate via SMS or email through the communications network 110 directly to the trainer/coach 100. The trainer/coach 100 thereafter inputs the necessary data through the communication network 110 into the system 120 to update the client 180 profile, note the responsiveness or lack of response to a particular message 170A or otherwise make such changes as are necessary to keep the client 180 profile current and maximize the efficacy of the automated messaging.

The trainer/coach 100 may also elect various services and plans that are provided within the system 120. Thus, for example, a trainer/coach 100 may opt to have only automated messages 165 go out to their clients 180. In another aspect, a trainer/coach 100 may opt to send out edited messages 166, build a series of links to videos and articles as well as additional promotions and data to potential clients 185, current clients 180 and former clients 190. The administrator 130 may edit and add to a trainer/coach 100 profile based upon the particular plan that the trainer/coach 100 has signed up for and the level of system support that the trainer/coach 100 has requested. The administrator 130 may also prevent a trainer/coach 100 from logging on and employing the system in the event that the trainer/coach 100 is not current in their payments.

In one embodiment of the system, the system 120 establishes a monthly recurring billing amount that is charged, optimally, to a credit card or bank account. If the credit card fails or the account has insufficient funds then the trainer/coach 100 will be suspended until such time as payment is made. The administrator 130 can then reactivate the account at that time without loss of data. The system 120 provides reports through a payment update module 135 on a daily basis to the administrator 130 in order to ensure that all trainer/coach 100 accounts are current and that those that are not current are placed in a suspense mode.

Figure 2:
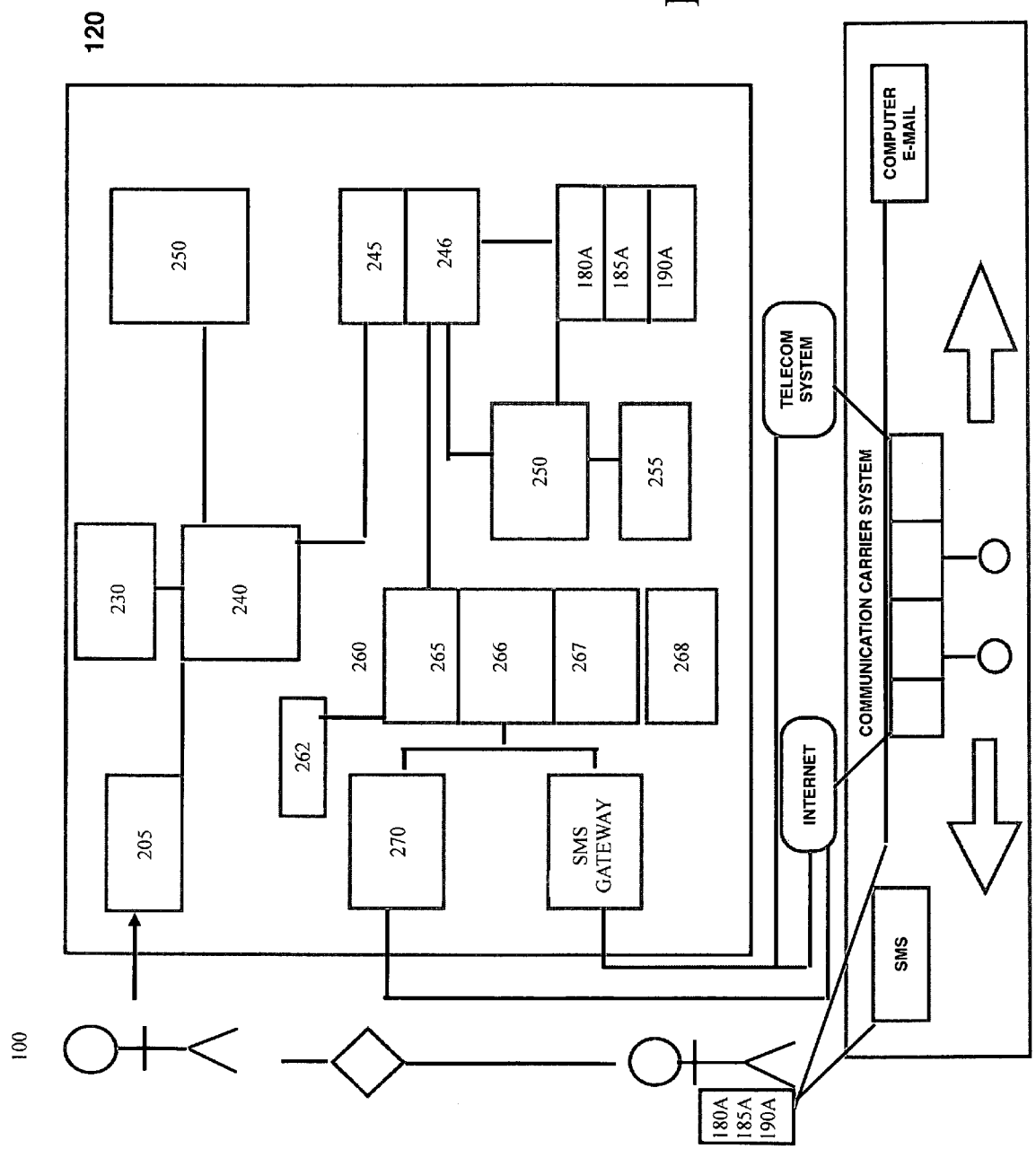
FIG. 2 is a block diagram that illustrates a preferred embodiment of a system for monitoring, managing, supporting, scheduling and prompting clients in accordance with the method, system and programs of the present invention.

Referring illustratively to FIG. 2, in accordance with an aspect of the invention, there is shown a system that permits the management of physical training and general coaching according to an embodiment of the present invention. A profile of a training or coaching participant (client 180) is created and stored using a client 180 profile creation/management module 245. In one aspect a training/coaching goal and a time schedule for the client 180 are established using a target planning module 246. The target planning module 246 creates a messaging schedule on the basis of the goal and the On Day schedule for the client 180. A message contents creation module 262 in the application engine 260 (or FIG. 1, application engine 160) creates contents on the basis of the pre-established messages 165, edited messages 166 and data inputs that the client 180 has provided e.g. weigh-in information for that week. The information is analyzed to create and provide the contents of the message content creation module 262 for the next message. Thus, by way of example, if the weigh-in information is in line with or better than the goal, then the nature of the motivational message for the client 180 is maintained, along with a further "WELL DONE" to further motivate the client 180.

Similarly, if the coaching client 180 reports, in response to a weekly message, that the goal that has been set in the prior face-to-face or telephone session with the trainer/coach has been achieved, then the next Off-Day message will be congratulatory and will contain a motivational message that is similar to the ones that had been sent in the previous round of messages.

Alternatively, if the weigh-in information or the goal achievement information is negative, then the Off-Day motivational message is altered to take into account the negative information received and to try to find a message framework and text to which the client 180 reacts more favorably. This can be accomplished by the trainer/coach 100 editing available messages 165 or by asking the application engine 260 to suggest more appropriate messages, based upon its analysis of responses from other clients 180. The application engine 260 can employ data obtained from other client 180 responses for this specific trainer/coach 100, as well as data obtained from clients 180 of other trainer/coaches 100, without revealing any personal information from those other clients 180.

In a further advantageous aspect of an embodiment of the invention, the application engine 260 can, on a no-name basis, evaluate the client 180 profiles of other individuals to assist in the editing and selection of an appropriate Off-Day message for the specific client 180 who has had a negative response. In a physical training context, the application engine 260 can review physical profiles of all clients 180 in the data base, find similar physical profiles, schedules of training and goals, determine where the training goals have been met most successfully, and then suggest to the trainer 100 the types of Off-Day messages that were used in those situations. In a coaching context, the application engine 260 can similarly search the coaching data base to review coaching context (using a key word or other search methodology) messages that have been most successful and suggest those to the coach 100 as the next message hierarchy that the coach 100 should employ.

The creation and storing of the client 180 profile is implemented by inputting the personal data and the response data directly required to manage the training/coaching of each client to the client master table in the data manager 245. The target planning module 246 is implemented such that the data can be modified or deleted in real-time by a coach or a trainer, and this principle is similarly applied to various modules as described below.

As a further aspect of the invention, a goal achievement planning procedure may be performed. Specifically, the trainer/coach 100 selects a client from the client 180 profile creation/management module 245 using a goal achievement planning module 246, establishes a goal, which could be a training goal or a coaching goal, and a time schedule for the selected client 180 to receive a motivational Off-Day message 170A tied to that goal. The goals designated for each client may include improvement of endurance, weight control, stress reduction, goal achievement at work etc.

In a further aspect of the invention and referencing FIG. 2, the data manager 245 may select from the user profile and client data manager 250 and determined to send a message 265, a reminder 266, a query 267 or some other form of messaging 268. The application engine 260 then transmits the selected form of messaging to either a server 270 or an SMS gateway 275 for transmission either over the Internet in the case of the server and SMS, gateway, or telecommunication system for the SMS gateway.

The telecommunication system and the Internet are associated with a communications carrier system which is comprised of one or more carriers. The message which has been selected by the application server 260 is communicated either to the SMS device designated by the client 180 or a computer system so designated. The client, upon receipt of the SMS message or email may respond directly to the trainer/coach 100. The trainer/coach 100 thereupon may enter the information provided by the client 180 into the system through the original sign-up portal 205 which then updates the user profile and the user data 250.

Figure 3:
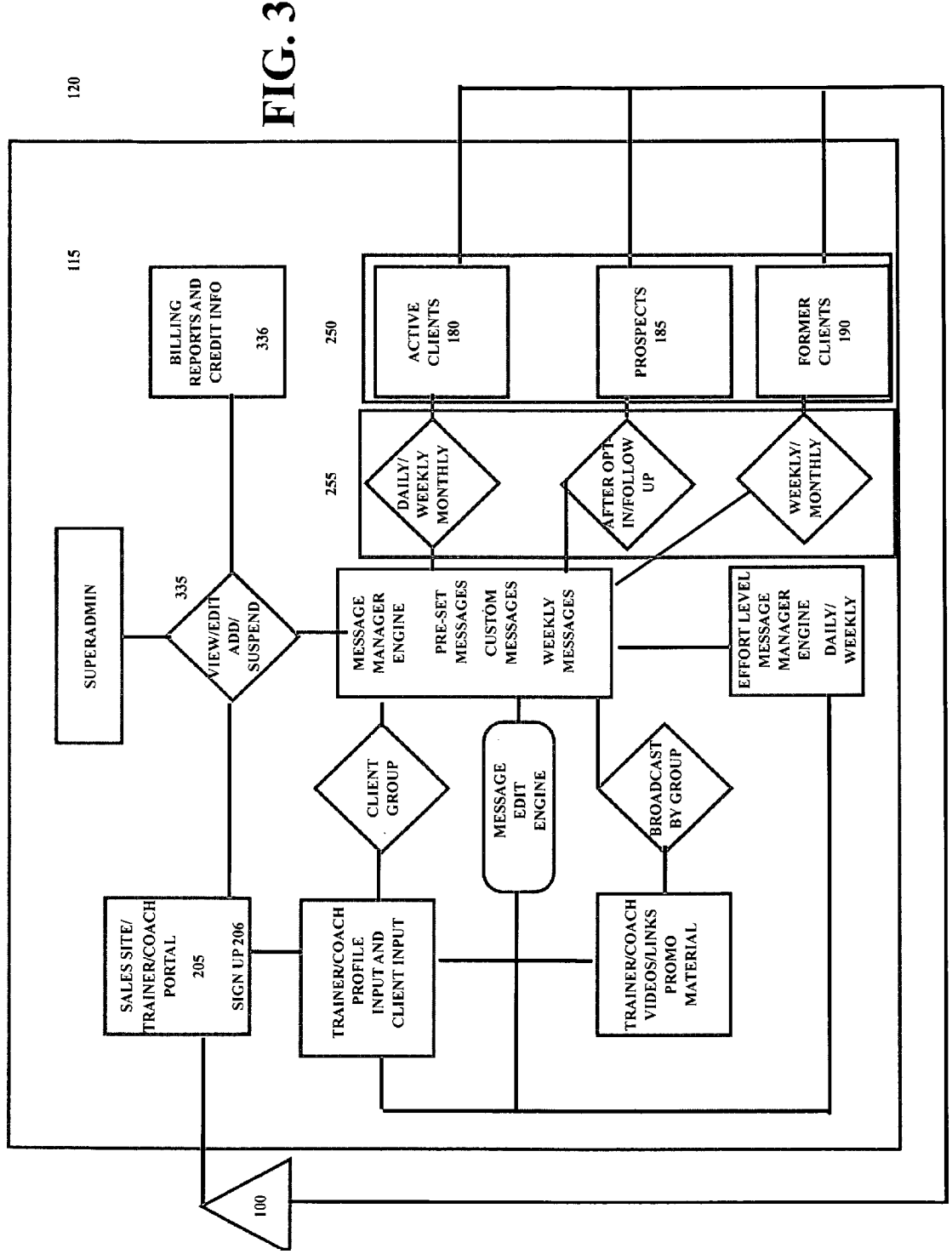
FIG. 3 is a high level flowchart and block diagram illustrating a system for monitoring, managing, supporting, scheduling and prompting clients in accordance with the method, system and programs of the present invention.

Referring to FIG. 2 and FIG. 3, it is yet another aspect of the invention to provide a multitiered user level 115 to support the messaging function of the system 120. The user levels 115, illustratively may be comprised of a super administrative level 330 which has the ability to login view and edit and otherwise modify trainer/coach 100 profiles. The super administrative level 330 may also be capable of viewing billing reports, evaluate client 180 responses and the regularity of such responses, edit messages and take other administrative level action to maximize the effectiveness of the system 120. The user levels 115 may also have a trainer/coach 100 level where the trainer/coach 100 has the ability to view add and edit clients 180 for inclusion in the system 120. The client has no direct login or portal but has a user level 115 associated with the client 180 profile data and is subject to the changes by the trainer/coach 100 who has imported the client data into the system.

The system 120 also provides a internal trainer/coach 100 billing system 335 comprised of a billing setup module 336 which is operable to provide a recurring billing for each trainer/coach 100. The billing set up module 336 is capable of billing on a weekly biweekly or monthly basis and is chronologically tied to the credit card or other account data provided by the trainer/coach 100. Thus for example the billing for a trainer/coach 100 maybe by ACH, credit card, debit card or other form of automated payment.

The billing system also provides to the super administrator 330 a daily account reconciliation in order to permit the super administrator to determine whether any trainer/coach 100 payment is in default. In the event that there is a default, that trainer/coach 100 account may, at the option of the super administrator 330, be suspended until such time as the account is made current. This may either be done automatically or at the initiation of the super administrator 330. The system 120 will continue to maintain the user profile and client information during the time that the client/coach 100 account is suspended so that the information will become available once the account is reactivated.

The material which may be advantageously stored within the user profile and related client data server 250 is a variable that may include information concerning the trainer/coach 100, the client 180 and the super administrator 330 responsible for the trainer/coach 100. Additional status information as to whether the trainer/coach 100 account is active, suspended or terminated may be provided and tied to the account type.

A trainer/coach 100 may also further input clients according to active client 180, prospective client 185 or former client 190. This arrangement permits the trainer/coach 100 to modify and select the messages to each of the members of his client base. Thus, an active client 180 may receive a motivational message whereas a former client 190 may receive a inquiry as to what they are doing or why are they no longer a client. In the case of a former client 190, the message may be directed to whether the former client has been dissatisfied with the trainer/coach 100, whether their goals have not been met, or what are the reason or reasons there may be for the former client no longer using the services of the trainer/coach 100.

In the case of prospective clients the messages may be promotional in nature to provide the prospective client 185 with links to sites speaking about the trainer/coach 100 or testimonials about the trainer/coach 100. They may also contain proposed plans for physical well-being or other material with regard to the benefits that can be obtained by using a trainer/coach 100 and particular benefits in using the individual sending the message.

In order to permit a trainer/coach 100 to participate in the system there is advantageously provided a front end sales portal 205 through which a trainer/coach 100 enters the necessary data in order to become a user of the system 120. The front-end sales portal 205 may provide, among other things, information about the features and benefits of the program generated by the system 120 and how it can benefit a trainer/coach 100 in increasing their client base and maintaining contact with their current client 180 base. The sales portal 205 may also have a sign-up module 206 which has, among other things, the various plans available to the trainer/coach 100, the costs associated with each plan and a form of contract that can be entered into between the entity providing the System 120 and the trainer/coach 100. Also on the sales portal 205 will be a provision to permit the trainer/coach 100 to enter securely financial information to permit the monthly or otherwise periodic billing to a financial instrument or financial account. Once a trainer/coach 100 signs the contract and provides the requisite billing information they are taken to a form to permit them to create their profile and to provide information concerning the current client base and the client generation objectives of the trainer/coach 100.

Each trainer/coach 100 will establish a series of classes in the client data 250 server which will then be responsive to the application programming interface (API) resident in the client profile manager 255. The API specifies how the software components should interact with each other and the relevant hardware. In addition to accessing databases or computer hardware, such as hard disk drives or video cards, the API can be used to ease the work of programming graphical user interface components and providing the variable, editable messaging.

It is known to those skilled in the heart that the API may come in the form of a library that includes specifications for routines, data structures, object classes, and variables. In some other cases, notably for SOAP and REST services, an API comes as just a specification of remote calls exposed to the API consumers. It is within the scope of the invention to use an API that may take one or more forms, including an International Standard such as POSIX, vendor documentation such as the Microsoft Windows API, the libraries of a programming language, e.g., Standard Template Library in C++ or Java API, as examples.

In general the client data 250 and the client profile manager 255 segregate the clients by three general categories including prospects 185, active clients 180 and former clients 190. Referring first to the active clients 180, the messaging may provide one or more daily text messages sent at a time preestablished by the trainer/coach 100 based upon the client 180 profile. Thus for example if the client 180 is someone who works out early in the morning, the first off day message may be scheduled for a time prior to their normal attendance at the gym. Second message may be at a time around when the person would be otherwise at work but thinking of lunch in order to remind them in terms of caloric intake.

By way of further example if the client 180 is a coaching client the first message may be at a time prior to their actually being at work in order for them to plan their day and incorporate the goal into their normal day. The second message may be a time in the afternoon asking whether the goal has been incorporated into the days activities and inquiring what the result has been. Such a message may also incorporate a request for feedback if the goal has not been incorporated and the reasons why. The message is not necessarily limited to the recitation of the specific goal but may also contain other motivational information, sayings, quotes and other communications all of which provide motivation for the client 180 to accomplish the goal or at least be thinking about accomplishing it.

Other illustrative messaging which may occur for a current client 180 is a daily request for their effort level. Such a request may contain a daily text, sent at a time of day specified in the client 180's profile which requests information relating to their exercise effort, quality and eating for that day, goal attainment, effort expended in achieving the goal, or similar client related inquiries. Each of those inquiries may, advantageously, be associated with a request for a reply directly to the trainer/coach 100 and to assign a numerical value from 1 to 10 in response to each of the inquiries. When the client 180 replies to each of the inquiries, the time which has elapsed between the generation of the message and it's response is noted and the values assigned to each of the inquiries is similarly noted and entered into the client data log for the responding client.

The database log has capture-the-data (CTD) capabilities such that each value is appropriately assigned to the client 180 identifier for the responding client. As a further example of a message request to a current client 180, a trainer may ask, on a weekly basis, for the client 180s weight in order to determine whether it has remained stable, increased, or decreased depending on the objective of the client 180 as discussed with the trainer 100.

In yet another example of a message request to a current client 180, a coach can request on a weekly basis whether the client 180 has taken agreed-upon steps during the time that they should have been taken or has affirmative action towards arriving at a longer-term goal, such as creating a resume for the long-term goal of changing jobs. In order to permit the entry of this into the user profile the response is generally requested as a value. Thus, for example, if weight is the required response then the actual weight is entered and a comparison performed to the objective.

Alternatively if the response is with regard to a specific goal, then the client 180 is asked to provide a numerical indication from 1 to 10 whether they have achieved that goal and taken the requisite steps towards achieving. The response in numerical format is then entered into the database and client profile in order to permit the client profile manager 255 to determine the messages which are appropriate for transmittal.

With regard to prospect clients 185, the trainer/coach 100 may create a series of automated messages to send to each prospect client 185 who has indicated that they wish to consult the trainer/coach 100. The trainer/coach 100 is provided access through a user interface which may be part of the portal 205 initially used for signing. Thus, for example, a trainer/coach who has joined the program may have a group of prospects who have indicated an initial willingness to employ the trainer/coach 100. One day after the prospect 185 has provided information to indicate that they wish to employ the trainer/coach one, a message may be sent to the prospect indicating: "Thanks for opting in, call me to schedule a consultation" and providing a contact telephone number or other direct contact information.

Similarly, an automated message may go out to those individuals from whom a trainer/coach 100 has not heard from for three or four days after the initial message asking why the trainer/coach 100 has not heard from them. For example the automated message could read: "I haven't heard from you, don't you want to get fit? Click this link to fill up my initial questionnaire" and providing either a link for the questionnaire or providing other contact information so that the prospective client can directly contact the trainer/coach 100.

As a further aspect of the invention, former clients 190 may be contacted in automatic text flow in the same manner as prospects. The automated texting however would be different inasmuch is the former client would be dealt with in a manner that indicates the trainer/coach's 100 concern for them, their goals and achievement of those goals whereas for potential clients the messaging would be directed more towards the establishment of goals. The entirety of the messaging for both former clients 190 and prospective clients 185 would be to create the impression of that the trainer/coach 100 has a continuing desire to work with the client and an interest in their well-being, as opposed to only having an interest in them as revenue potential.

Accordingly, text for promotionals, special new program launches and others can be sent to all of the clients on a broadcast basis or the broadcast can be limited to particular classes. For example, a promotional may only going to existing clients 180 whereas links to information on healthcare issues could be broadcast to former clients 190. Generally the providing of the messaging on a regular basis helps to create and maintain a strong relationship between the clients, both current and former so that to the extent the client wishes to reengage they will remember the trainer/coach 100.

Moreover, particularly in the area of wellness coaching and life coaching, clients 180 tend to have discrete goals and objectives such that when a goal or objective is attained they tend to not continue to use the coach 100 until some other issue arises. Thus, in the coaching environment, be it wellness coaching or life coaching, it is important to maintain a relationship with former clients inasmuch as they continue to be individuals who can provide referrals and additional opportunities to assist them when new issues arise that require a coach.

Figure 4:
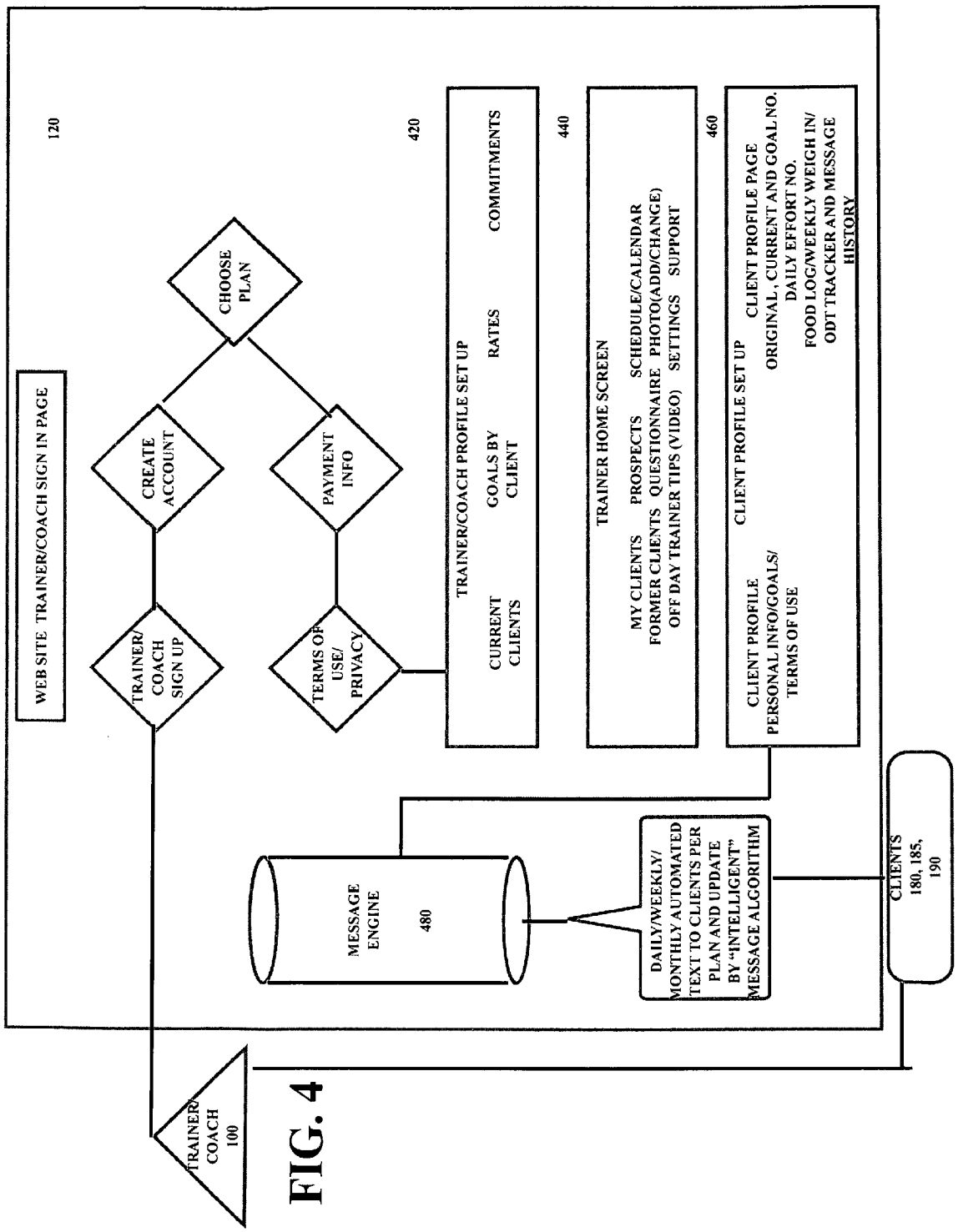
FIG. 4 is a high level flowchart and block diagram illustrating a system and method for individualizing and delivering messages and for otherwise monitoring, managing, supporting, scheduling and prompting clients in accordance with the method, system and programs of the present invention.

As is best seen in FIG. 4, the there is shown a user interface 205 which may be part of a website for the program 120. The trainer/coach 100 is permitted to sign up for the program 120 and create their individual account. Once the trainer coach 100 has initiated the creation of their account they are asked to choose a particular plan which they would like to join. Each plan has different options including the number of messages, the option to modify and individualize the messages, the ability to have predetermined messages go out including ones designed by program manager and the administrator and various other alternatives.

As a part of creating the account the trainer/coach 100 is asked to provide payment information which will permit periodic billing for the use of program 120. There is as a part of the sign-up a contractual page provides the terms of use and privacy policy both for the trainer/code 100 and recommended privacy policy for the individuals whose data will be resident on the servers used in the program.

In a further aspect of the invention, there is a welcome/profile set up module 420 which provides the trainer/coach 100 the ability to input clients and related client information. By way of example only the profile setup may include current clients with rates and other personal information relevant to the particular client 180. It may include information related to the goals that have been set by the client 180 as well as aspirational goals that the trainer/coach 100 thinks may be achievable and wishes to recommend in the future.

As a further part of the profile set up, there is a provision made for commitment levels both on behalf of the trainer/coach 100 and the client 180. The use of the commitment level permits the trainer coach 100 to have a record of the specific goals that have been agreed to be met by both the trainer/coach 100 and the client and an ability to track the level of accomplishment.

As yet a further part of the program, a trainer home screen 440 may advantageously be provided on which there is a listing of the various specific items of importance to the trainer/code 100 and the clients 180.

By way of example, the trainer home screen 440 may contain information about clients, prospects, scheduling and calendars for clients and for the month. It may also contain a listing of former clients and various specific questionnaires which can be adapted for use with prospective and former clients. Off-Day trainer tips, such as videos and links to other activities, and specific forms of either exercise, diet, or informational material which assists in life coaching goal attainment may also be provided on the trainer home screen 440. Moreover the home screen 440 can have various settings and support information contained therein which may either be provided by the program 120 or may be filled by the trainer/code 100.

Once a prospect 185 opts in there is an auto response which welcomes the prospect 185 and provides a questionnaire to permit the prospect 185 to enter the relevant data for the trainer/coach 100. Once the questionnaire has been filled a post questionnaire response is automatically forwarded by way of a message to the prospect welcoming them and suggesting a time for a consultation or suggesting that one be scheduled. If the prospective client has signed up for a training session, then various available times will be suggested so that one training session can set up.

If the client 185 has signed up for life coaching or other similar coaching, a time for an initial intake interview is suggested so that the coach 100 and the prospective client 185 can discuss the issues and goals which the client 180 is seeking to be coached on.

Following the signing up of the prospective client 185, thus making them a current client 180, the trainer/coach 100 inputs the data provided by the client 180 through a client profile set up module 460. The client profile set up module 460 permits entry and use of personal information, current contact information, goals and a terms of use and privacy agreement, all of which are required for the client prior to commencing the engagement. Following the creation of the client profile, the trainer/coach 100 can input original goal information, current and other goal numbers, projected daily efforts. In the event that the client 180 is requesting specific assistance and training for weight related issues, a food log and weekly weigh-in may be a part of the profile page.

If the client is seeking life coaching, then a goal page may be established along with objectives and overall coaching outline. A further part of the profile, if life coaching is the object of the client's 180 retention of the client/coach 100, may be additional history of the client 180, as well as the relationship between the historical events which led up to the request for coaching and the end result which the client 180 seeks to obtain as a result of the coaching.

The information, on a periodic basis, may all be archived and accessed both prior to face-to-face meetings between the trainer/coach 100 and the client 180 and in the review of the automated messages provided to the client 180 during the off day messaging periods. Based upon all of the above information, daily, weekly and monthly automated text messages are sent to clients 180, former clients 190, and prospective clients who have provided a minimum of information in order to permit accurate response and messaging to be sent order to persuade them to become clients. Moreover, based upon response data and effectiveness of specific automated messaging, the message engine 480 may update and modify messages and select the messages that appear to provide the greatest success, based upon it analysis of responses both with specific clients and overall.

While the above has been generally described in relationship to training and coaching, the system and its various aspects and embodiments are similarly applicable and may be employed by various persons or entities who seek to communicate and provide interaction with their clients or customers during times when those customers are not in personal contact with the persons or entities. Thus, this invention could be advantageously employed by doctors communicating to patients between visits or appointments, nutritionists communicating with clients, sales organizations who wish to remind clients to buy repeatedly used goods (or to buy complementary goods), as well as others in similar fields.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A communication system for maintaining contact between a user and a client during periods where there is a no direct personal contact, using a computer based communication device connected through a network, comprising:
   a processor that may be accessed via the network by a communication device;
   a non-transitory computer readable storage medium storing instructions that when executed, cause the system to perform the actions designated by a terminal;
   a memory module configured to store at least one client based indicia determined at a time of direct personal contact between the user and the client;
   a memory module configured to store at least one set of a plurality of pre-established, client relevant user communications;
   a message processor configured to automatically transmit to the client, at a time when there is no direct personal contact between the user and the client, at least one of the pre-established, client relevant user communications based upon the at least one client based indicia;
   a message processor configured to receive a return communication from a client;
   an application processor engine configured to determine an efficacy indicator for each of the plurality of pre-established communications and establish an efficacy hierarchy matrix based upon client responses to the pre-established communications wherein the efficacy hierarchy matrix is self-adapting to create additional pre-established communications based upon client responses.

2. A communication system in accordance with claim 1 in which the computer based communication device is a mobile phone connected in at least a partial wireless communication system.

3. A communication system in accordance with claim 2 wherein the mobile phone is configured to receive and transmit data in response to the receipt of the pre-established communication.

4. A communication system in accordance with claim 1 wherein the pre-established communication are user generated.

5. A communication system in accordance with claim 1 wherein the pre-established communication are non-user generated.

6. A communication system in accordance with claim 1 further comprising a memory module configured to store client data.

7. A communication system in accordance with claim 6 further comprising:
   a processor configured to compare the client data with the at least one client-based indicia;

a non-transitory computer readable storage medium configured to store a rules set for at least one client which, when executed, cause the system to perform the actions designated by the rules; and, an application processor response transmission engine configured to communicate to the client a pre-established communication based upon and responsive to the rules set and the comparison performed by the processor.

8. A communication method for maintaining contact between a user and a client during periods where there is no direct personal contact, using a computer communication device connected through a network, comprising:

a. accessing a processor via the network by a communication device;

b. executing stored instructions located in non-transitory computer readable storage medium that, when executed, cause the system to perform the actions designated by the terminal;

c. storing at least one client based indicia determined at a time of direct personal contact between the user and the client;

d. storing at least one set of a plurality of pre-established, client relevant user communications;

e. automatically transmitting to the client, at a time when there is no direct personal contact between the user and the client, at least one of the pre-established, client relevant user communications based upon the at least one client based indicia;

f. receiving a return communication from a client; and, g. determining an efficacy indicator for each of the plurality of pre-established communications and establishing a efficacy hierarchy matrix based upon client responses to the pre-established communications wherein the efficacy hierarchy matrix is self-adapting to create additional pre-established communications based upon client responses.

9. A communication method in accordance with claim 8 in which the computer based communication device is a mobile phone connected in at least a partial wireless communication system.

10. A communication method in accordance with claim 9 wherein the mobile phone receives and transmits data in response to the receipt of the pre-established communication.

11. A communication method in accordance with claim 8 wherein the pre-established communication are user generated.

12. A communication method in accordance with claim 8 wherein the pre-established communication are non-user generated.

13. A communication method in accordance with claim 8 further comprising the step of storing client data.

14. A communication method in accordance with claim 13 further comprising:

a. comparing the client data with the at least one client-based indicia;

b. storing a rules set for at least one client response in a non-transitory computer readable storage medium which, when executed, causes the system to perform the actions designated by the rules; and, c. transmitting to the client a pre-established communication based upon and responsive to the rules set and the comparison performed by the processor.

\* \* \* \* \*